(12) United States Patent
Bureau et al.

(10) Patent No.: US 9,096,766 B2
(45) Date of Patent: Aug. 4, 2015

(54) METHOD FOR FORMING A POLYMER FILM ON A SURFACE THAT CONDUCTS OR SEMICONDUCTS ELECTRICITY BY MEANS OF ELECTROGRAFTING, SURFACES OBTAINED, AND APPLICATIONS THEREOF

(75) Inventors: Christophe Bureau, Juvisy-sur-Ogre (FR); José Gonzalez, Paris (FR); Guy Deniau, Auffargis (FR)

(73) Assignee: Commissariat à l'Energie Atomique, Paris (FR)

( * ) Notice: Subject to any disclaimer, the term of this patent is extended or adjusted under 35 U.S.C. 154(b) by 2386 days.

(21) Appl. No.: 10/573,947

(22) PCT Filed: Sep. 28, 2004

(86) PCT No.: PCT/FR2004/002449
§ 371 (c)(1),
(2), (4) Date: Apr. 17, 2007

(87) PCT Pub. No.: WO2005/033378
PCT Pub. Date: Apr. 14, 2005

(65) Prior Publication Data
US 2007/0281148 A1    Dec. 6, 2007

(30) Foreign Application Priority Data

Oct. 1, 2003 (FR) .................................... 03 11491

(51) Int. Cl.
*C09D 5/44* (2006.01)
*C25D 9/02* (2006.01)
(52) U.S. Cl.
CPC ............... *C09D 5/4476* (2013.01); *C25D 9/02* (2013.01); *Y10T 428/265* (2015.01)

(58) Field of Classification Search
CPC ............................................ C25D 9/02
USPC ................................. 205/317, 235
See application file for complete search history.

(56) References Cited

U.S. PATENT DOCUMENTS

| | | | | |
|---|---|---|---|---|
| 3,554,882 A | * | 1/1971 | Hodes et al. .................. | 205/317 |
| 3,619,300 A | * | 11/1971 | Heller et al. .................. | 148/262 |
| 4,267,207 A | * | 5/1981 | Sasazawa et al. ............. | 427/129 |
| 4,547,270 A | * | 10/1985 | Naarmann ..................... | 205/160 |
| 4,847,143 A | * | 7/1989 | Watanabe et al. .............. | 442/89 |
| 5,567,297 A | | 10/1996 | Mertens et al. | |
| 5,578,188 A | | 11/1996 | Mertens et al. | |
| 5,980,723 A | | 11/1999 | Runge-Marchese et al. | |
| 6,375,821 B1 | | 4/2002 | Jerome et al. | |

FOREIGN PATENT DOCUMENTS

EP    0 324 950 B1    3/1992

OTHER PUBLICATIONS

Arthur Rose et al, The Condensed Chemical Dictionary, Reinhold Book Corporation, New York, 1968, pp. 486-487.*

* cited by examiner

*Primary Examiner* — Bryan D. Ripa
(74) *Attorney, Agent, or Firm* — Alston & Bird LLP

(57) ABSTRACT

The invention relates to a method for forming a polymer film on a surface that conducts or semiconducts electricity by means of electrografting. Said method uses an electrolytic solution containing a selected quantity of Bronsted acid. This invention also relates to the electrically conductive or semiconductive surfaces obtained by means of said method.

8 Claims, 3 Drawing Sheets

METHOD FOR FORMING A POLYMER FILM ON A SURFACE THAT CONDUCTS OR SEMICONDUCTS ELECTRICITY BY MEANS OF ELECTROGRAFTING, SURFACES OBTAINED, AND APPLICATIONS THEREOF

FIELD AND BACKGROUND OF THE INVENTION

The present invention relates to a process for the formation of a polymer film on an electrically conducting or semiconducting surface by electrografting employing an electrolytic solution including a Bronsted acid, and to the electrically conducting or semiconducting surfaces obtained by employing this process.

The preparation of electrically conducting or semi-conducting surfaces covered with polymer films is of great interest in numerous fields, in particular for the manufacture of electronic components or integrated optical devices, for the preparation of devices which can be used in the biomedical field or in biotechnologies (DNA chips, protein chips, and the like), for protection from corrosion, and for any modification to the surface properties of metals or semiconductors.

It appears to be accepted today that the preparation of grafted polymer films by electrografting of activated vinyl monomers to conducting surfaces proceeds by virtue of electro-initiation of the polymerization reaction starting from the surface, followed by growth of the chains, monomer by monomer. The reaction mechanism of electrografting has been described in particular in the papers by C. Bureau et al., Macromolecules, 1997, 30, 333; C. Bureau and J. Delhalle, Journal of Surface Analysis, 1999, 6(2), 159, and C. Bureau et al., Journal of Adhesion, 1996, 58, 101.

By way of example, the reaction mechanism of the electrografting of acrylonitrile by cathodic polarization can be represented according to SCHEME 1 below, in which the grafting reaction corresponds to stage No. 1, where the growth takes place starting from the surface; stage No. 2 being the main side reaction which results in the production of an ungrafted polymer:

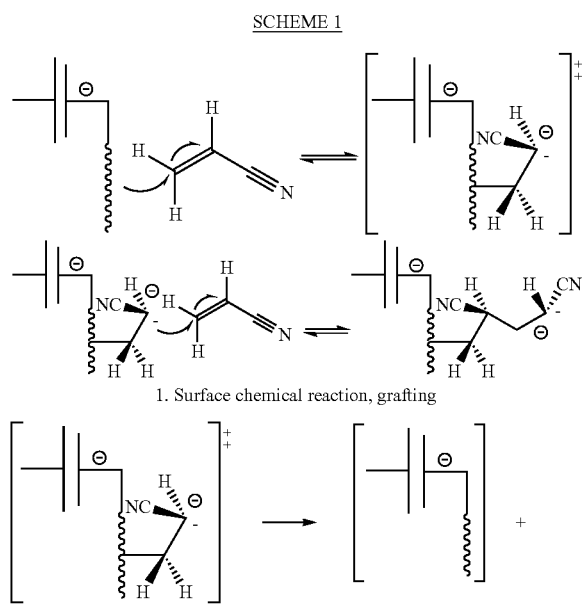

SCHEME 1

1. Surface chemical reaction, grafting

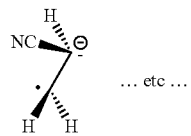

-continued

... etc ...

2. Desorption, Solution Polymerization

The growth of the grafted chains thus takes place by purely chemical polymerization, that is to say independently of the polarization of the conducting surface which has given rise to the grafting. This stage is therefore sensitive to (is in particular interrupted by) the presence of chemical inhibitors of this growth.

In Scheme 1 above, where the electrografting of acrylonitrile under cathodic polarization has been considered, the growth of the grafted chains takes place by anionic polymerization. This growth is interrupted in particular by protons and it has been demonstrated that the content of protons actually constitutes the major parameter which controls the formation of polymer in solution and the data recovered during synthesis, in particular the course of the voltammograms which accompany the synthesis (see, in particular, the paper by C. Bureau, Journal of Electroanalytical Chemistry, 1999, 479, 43).

One of the objectives sought since the start of studies on the electrografting of polymers has been to obtain thick and homogeneous films, so appealing was the idea of being able to fully marry plastics and metal objects. This objective assumed it was possible to obtain, by electrografting, grafted polymer chains of high molecular weight, after the fashion of what was obtained in conventional macromolecular chemistry, and thus retained growth of the chains.

As this growth is ionic, and in particular anionic when the electrografting is carried out under cathodic polarization, it was accepted that traces of water, and more generally the labile protons of protic solvents and/or of any compound behaving as a Bronsted acid, in the reaction medium constitute sources of protons which are harmful to the growth of the grafted chains. The term "solvent" will be understood in this context as meaning the complete electrolytic medium in which the electrografting is carried out and comprising in particular an essentially uninvolved liquid with a sufficient permittivity to make possible the dissolution of a salt and to provide electrical conduction in the liquid phase, a support electrolyte or salt, and optional additives (and in particular, in the present case, water).

In fact, even before the reaction mechanisms of the electrografting of vinyl monomers had been understood, this obstructing technical point had been clearly identified by a person skilled in the art, as testified by the details of the various processes developed on the basis of these compounds:

in Patent Application FR-A-2 480 314, the authors mention a process for the electrografting of vinyl monomers which consists in preparing a solution having a water content of at most $10^{-3}$ mol/l and even specify, in a favoured embodiment, that this water content has to be at most $5 \times 10^{-4}$ mol/l;

in Patent Application EP-A-0 618 276, the authors mention a process for the electrografting of vinyl monomers employing an aprotic solvent;

in Patent Application EP-A-0 665 275, the authors also mention a process for the electrografting of vinyl mono-

} mers employing aprotic organic solvents. In addition, the descriptive part of this prior application specifies that the water content of the electrolysis bath is preferably less than $10^{-3}$M. Thus, and before the electrolysis, the electrolysis bath is degassed by bubbling with an inert gas comprising at most 5 ppm of water and 10 ppm of oxygen;

in U.S. Pat. No. 6,180,346, the authors use a process for the electropolymerization of molecules comprising vinyl substituents. By way of example, they mention the use of acetonitrile as solvent and specify that the latter has to be dried before use, which, for a person skilled in the art, reflects a residual water content of the order of a few tens of ppm at most;

in U.S. Pat. No. 5,578,188, the authors claim a process for the deposition of a composite film by electropolymerization on an electrically conducting surface, according to which a mixture comprising:

(a) a precursor monomer of a polymeric nonconducting polymer,
(b) a substance forming a doping agent intended to be incorporated in this polymer,
(c) a support electrolyte and
(d) an aprotic solvent, having argued in the descriptive part on the need to have recourse to monomers, support electrolytes, doping agents and solvents which observe the constraints of aproticity necessary for the reaction;

and, finally, in U.S. Pat. No. 6,325,911 and U.S. Pat. No. 6,375,821, the authors describe processes for grafting polymers to carbonaceous substrates or to particles by electropolymerization of vinyl monomers using an electroconducting mixture comprising:

(a) at least one monomer capable of forming a polymer on the substrate,
(b) an aprotic solvent and
(c) an electrolyte for increasing the electrical conductivity of the mixture.

The implementational examples report experimental situations in which the combination of the liquid reactants which are used has been purified, in particular by distillation or by leaving over powerful drying agents, so as to render the medium aprotic.

The very low water contents required by the electrografting of vinyl monomers are generally maintained, according to the teaching of the documents of the abovementioned prior art, during or before the synthesis, via sparging with dry inert gas (nitrogen, argon, and the like), the water content of which is of the order of a few ppm, indeed even by carrying out the electrolyses in closed chambers of the glove-box type, placed under a controlled atmosphere of argon or of nitrogen.

For analogous reasons of controlling the content of sources of protons in the reaction medium, only aprotic solvents and monomers which are themselves aprotic, that is to say, which do not comprise functional groups having acid functions (with the Bronsted sense) in the study solvent, have been proposed for producing electrografted organic films.

In practice, the water content of these solvents is lowered at the expense of a lengthy and tedious preparation, for example via leaving over dehydrating compounds, such as phosphorus pentoxide ($P_2O_5$), or over molecular sieves (for example, with a porosity of 4 ångströms), via distillation under reduced pressure of inert rare gases (nitrogen, argon, and the like) or via a combination of these methods. It is thus recorded:

in Patent Applications FR-A-2 480 314 and EP-A-0 618 276, that the authors recommend the use of an aprotic organic solvent which does not give a side reaction with the monomer used;

in Patent Application EP-A-0 665 275, apart from the fact of mentioning the use of aprotic solvents, the authors offer in a variety of forms the monomer structures which can be used and specify that the possible protic functional groups of the monomer or monomers have to be masked beforehand.

In practice, the monomers used for electrosynthesis are distilled before use, so as to remove various additives and in particular polymerization inhibitors added by the manufacturer to stabilize the product and to prevent it from polymerizing in the bottle under storage conditions.

It will be noted only that Patent Application EP-A-0 665 275 mentions the use of specific inhibitors in order to be able to introduce novel functionalities at the end of the growing polymer chains. However, it has been demonstrated, in particular in the paper by C. Bureau et al., 1996 (mentioned above), that the growth of the polymer chains on the surface is necessarily anionic, and it is probable that the radical inhibitors introduced by the authors are found in the film at the end of the synthesis because they are adsorbed and/or reduced on the surface of the electrode (they are generally electroactive) and not because they interrupt the growth of the chains, as indicated in Patent Application EP-A-0 665 275.

In fact, entirely advantageous results, in particular in terms of homogeneity, have been obtained in the electrografting of polymers to metals by carrying out the electrografting starting from thoroughly aprotic solutions and under controlled atmospheres.

However, whatever the bibliographic sources, these results report only ultrathin electrografted films, typically with a thickness of between a few nanometres and a few tens of nanometres at best. It is important to stress the fact that this concerns thicknesses of films which are truly electrografted to the surface, that is to say of films resulting from stage No. 1 of SCHEME 1 described above. The polymer formed in solution, according to stage No. 2 of this scheme, and which can be deposited on the surface during electrosynthesis, is generally easily removed by rinsing the surface with a solvent of the said polymer, optionally under ultrasound, whereas the electrografted polymer withstands this treatment.

Even if these thickness ranges are already advantageous for certain applications, a real need is observed, at the same time, to improve the synthetic conditions in order to increase the thicknesses accessible and/or in order to obtain better control and better reproducibility of the fine thicknesses, in particular within the range between 10 nm and 1 μm, and, secondarily, to access these thickness ranges with synthetic conditions which are less drastic than those used to date, in order to be able to be industrially applicable.

U.S. Pat. No. 3,759,797 reports the preparation of polymer films on electrically conducting surfaces on the basis of formulations comprising in particular vinyl monomers and additives of short-chain thiol or alcohol type (and in particular ethanol) or quinones. The authors of this invention mention that these additives make it possible to limit the polymerization in solution and, correspondingly, to reinforce the reactions for growth starting from the surface. While the implementational examples of this patent show the reduction in the amount of polymer formed in solution, they do not make it possible to assess the behaviour, in particular with regard to thickness, of the part remaining on the surface, since no characterization of the surface or any measurement of thickness of the coating obtained is carried out. In addition, the technical data are insufficient to assess actual conditions of water content of the medium.

SUMMARY OF THE INVENTION

However, the inventors have found that the inclusion of short-chain alcohols (and in particular of ethanol) in the formulation of the reaction bath used to carry out the electrografting does not make it possible either to increase the thicknesses of films obtained or to control them. On the contrary, it is observed that the thicknesses of the films obtained are increasingly thin as the concentration of ethanol increases, which is in accordance with the "conventional" interpretation of the effect of protic additives (such as ethanol) on anionic polymerization reactions.

It is therefore in order to overcome all these major disadvantages and to provide for a process for the formation of a polymer film on an electrically conducting or semiconducting surface which makes it possible in particular to control the thickness of the films obtained which is easy to implement from an industrial viewpoint that the inventors have developed that which constitutes the subject-matter of the invention.

The inventors have now developed formulations of the reaction bath used for electrografting by virtue of which they manage to obtain electrografted organic films on electrically conducting or semiconducting surfaces with thicknesses greater than those obtained under, and inaccessible to, the usual conditions.

Contrary to the preconceptions in force to date in this field, the formulations of the invention all comprise a source of protons chosen from compounds which are Bronsted acids in the electrolytic solution, such as water in particular, in proportions selected between 50 and 100 000 ppm with respect to the other constituents of the reaction bath. The choice of the source of protons and the selection of their concentration range in the reaction bath make it possible in addition to strictly control the thicknesses obtained: this control proves to be novel for "thick" films (thicknesses of greater than 10 nm) and better than that accessible in a strictly anhydrous medium for ultrathin films (<10 nm).

A first subject-matter of the present invention is thus a process for the formation of a polymer film on an electrically conducting or semiconducting surface by electrografting, characterized in that it consists:
a) in preparing an electrolytic solution comprising one or more electropolymerizable monomers and at least one source of protons which is chosen from compounds which are Bronsted acids in the said electrolytic solution, the said source of protons being present in an amount of between 50 and 100 000 ppm with respect to the total amount of the constituents of the said electrolytic solution; and
b) in electrolysing the said solution in an electrolysis cell by using the conducting or semiconducting surface to be covered as working electrode and at least one counter electrode, to result, by electroreduction or electro-oxidation of the said solution, in the formation of an electrografted polymer film on the said surface.

Within the meaning of the present invention, the term "Bronsted acid" is understood to mean any substance which, within the electrolytic solution employed in accordance with the process defined above, comprises at least one functional group carrying at least one labile proton (or at least one labile isotope, such as deuterium or tritium) and which is partially (weak acid) or completely (strong acid) ionized, indeed even dissociated, in the said solution to give the conjugate base of the compound and a solvated proton (respectively: deuterium or tritium). In water, a compound is easily marked out as a Bronsted acid by its acidity constant, or pKa: the compounds which constitute the acid form of pairs having a pKa of less than 14 are Bronsted acids (the acids being weak (partially dissociated) if their pKa is between 0 and 14 and strong (completely dissociated) if their pKa is negative). In an organic solvent having a constituent molecule comprising protons (respectively deuterium or tritium), it may be considered that a compound is a Bronsted acid if its pKa in this solvent is less than the autoprotolysis product of the solvent. For example, it is illustrated, in the article by G. Deniau et al., 1998, Journal of Electroanalytical Chemistry, 451, 145, that 2-butenenitrile is a weak Bronsted acid in acetonitrile. In some favourable cases, theoretical models make it possible to establish a correspondence between the pKa scales in water and their equivalents in a given organic solvent, which makes it possible to take advantage of the literature data, since the pKa values of numerous compounds in water are available today. Theoretical models again, based on quantum chemistry, also make it possible to calculate the pKa of certain acid/base pairs in various solvents, as is illustrated in the paper by G. Deniau et al., (mentioned above). When the electrolytic solution comprises other molecules, such as, for example, a support electrolyte or electropolymerizable monomers, and the like, it is preferable to resort to the measurement, direct or indirect, of the content of protons which is generated as a result of the introduction into the medium of the presumed Bronsted acid. This can be carried out by a measurement using a conductimeter (measurement of the change in conductivity of the solution) or a Karl-Fischer device. This is also a way which makes it possible to determine the Bronsted acid nature of a compound in a solvent having a molecular structure not comprising protons.

Mention may very particularly be made, among the Bronsted acids which can be used in accordance with the process in accordance with the invention, of water and compounds which are Bronsted acids in water, such as weak acids, such as, for example, hydrogen fluoride, ammonium fluoride, nitrous acid, molecules carrying carboxylic acid groups (such as acetic acid, citric acid, amino acids and proteins, and the like) or ammonium, amine, pyridinium or phenol groups, and the like, and strong acids (such as, for example, sulphuric acid, nitric acid, hydrogen chloride and perchloric acid), molecules carrying sulphuric, sulphonic or thiol groups, and the like.

According to this process, the electropolymerizable monomers are preferably chosen from activated vinyl monomers and from cyclic molecules cleavable by nucleophilic attack corresponding respectively to the following formulae (I) and (II):

(I)

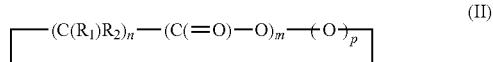

(II)

in which:
A, B, $R_1$ and $R_2$, which are identical or different, represent a hydrogen atom; a $C_1$-$C_4$ alkyl group; a nitrile group; an organic functional group chosen from the following functional groups: hydroxyl, amine: —$NH_x$ with x=1 or 2, thiol, carboxylic acid, ester, amide: —C(=O)NH$_y$ in which y=1 or 2, imide, imidoester, acid halide: —C(=O)X in which X represents a halogen atom chosen from fluorine, chlorine, bromine and iodine, acid anhydride: —C(=O)OC(=O), nitrile, succinimide, phthalimide, isocyanate, epoxide, siloxane: —Si(OH)$_z$ in which z is an integer between 1 and 3 inclusive; benzoquinone, carbonyldiimidazole, para-toluene-sulphonyl, para-nitrophenyl chloroformate, ethylenic and vinyl, aromatic and in particular toluene, benzene, halobenzene, pyridine, pyrimidine, styrene or halostyrene and their substituted equivalents; a functional group which can complex cations and in particular cations of reducible metals, such as, for example, copper, iron and nickel; molecular structures substituted and/or functionalized starting from these functional groups; groups which can be cleaved by thermal or photon activation, such as diazonium salts, peroxides, nitrosoanilides, alkoxyamines and in particular 2,2,6,6-tetramethyl-1-piperidinyloxy (TEMPO), benzophenone and its derivatives, dithioesters, dithiocarbamates or trithiocarbonates; electroactive groups and in particular the precursors of conducting polymers, such as aniline, thiophene, methylthiophene, bisthiophene, pyrrole, ethylenedioxythiophene (EDOT) and analogues, and electrocleavable groups, such as diazonium salts, sulphonium salts, phosphonium salts and iodonium salts; and the mixtures of the abovementioned monomers and groups;

n, m and p, which are identical or different, are integers between 0 and 20 inclusive.

In the above notation, $R_1$ and $R_2$ are groups which implicitly depend on an index i (not indicated), i being between 0 and n. This expresses the fact that the $R_1$ and $R_2$ groups can in fact be different from one $(C(R_1)R_2)$ to another in the structure of the cyclic molecules of formula (II), that is to say that the notation $(C(R_1)R_2)_n$ employed does not refer to the repetition of the same $(C(R_1)R_2)$ unit but to the succession of groups of $(C(R_1)R_2)$ type where the $R_1$ and $R_2$ groups form part of the above list.

Mention may in particular be made, among the functional groups of the activated vinyl monomers of formula (I) above which can complex cations, of amides, ethers, carbonyls, carboxyls and carboxylates, phosphines, phosphine oxides, thioethers, disulphides, ureas, crown ethers, aza-crown compounds, thia-crown compounds, cryptands, sepulcrates, podands, porphyrins, calixarenes, bipyridines, terpyridines, quinolines, ortho-phenanthroline compounds, naphthols, isonaphthols, thioureas, siderophores, antibiotics, ethylene glycol and cyclodextrins.

Mention may in particular be made, among activated vinyl monomers of formula (I) above, of acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate, acrylamides and in particular methacrylamides of aminoethyl, aminopropyl, aminobutyl, aminopentyl and aminohexyl, cyanoacrylates, diacrylates or dimethacrylates, triacrylates or trimethacrylates, tetraacrylates or tetramethacrylates (such as pentaerythritol tetramethacrylate), acrylic acid, methacrylic acid, styrene and its derivatives, para-chlorostyrene, pentafluorostyrene, N-vinylpyrrolidone, 4-vinylpyridine, 2-vinylpyridine, vinyl halides, acryloyl halides, methacryloyl halides, divinylbenzene (DVB) and more generally vinyl crosslinking agents or crosslinking agents based on acrylate, on methacrylate, and on their derivatives.

Mention may in particular be made, among cleavable cyclic molecules of formula (II) above, of epoxides, lactones and in particular butyrolactones, ε-caprolactone and its derivatives, lactic acid, glycolic acid, oxiranes, and their mixtures and their derivatives.

The concentration of electropolymerizable monomers within the electrolytic solution according to the process in accordance with the invention can vary from one monomer to another. However, this concentration is preferably between 0.1 and 10 mol/l and more preferably between 0.1 and 5 mol/l.

According to a specific embodiment of the process in accordance with the invention, the electrolytic solution can additionally comprise at least one essentially uninvolved (that is to say, not participating in the electropolymerization reaction) additional liquid (solvent) intended to dissolve the electropolymerizable monomer or monomers which would be insoluble or only slightly soluble in water, in order to allow them to move in order to come into contact. However, it is nevertheless important to note that the presence of such a liquid is not always necessary as it is possible to envisage situations where the monomer or monomers used are used pure, or else where some of the monomers of a mixture of monomers act as solvent, or else where all the monomers of a mixture of monomers are in miscible proportions.

When they are used, these solvents are preferably chosen from dimethylformamide, ethyl acetate, acetonitrile, tetrahydrofuran, dichloroethane and more generally chlorinated solvents.

The process in accordance with the invention exhibits the advantage of making possible the direct use of these solvents without it being necessary to subject them to a preliminary distillation in order to remove the water present therein or to strictly control the water content of the atmosphere above the reaction medium. For this reason, the process in accordance with the invention can be easily implemented on an industrial scale.

In the same way, according to another embodiment of the process in accordance with the invention, the electrolytic solution can also include at least one support electrolyte so as to provide for and/or to improve the passage of the current in the electrolytic solution. The use of a support electrolyte is, however, not essential, for example in the case where the electropolymerizable monomer used itself comprises ionic groups (such as, for example, the ammonium chloride of aminohexyl methacrylate) which then ensure that the ohmic drop of the electrical circuit is maintained at an acceptable value.

When they are used, the support electrolytes are preferably chosen from quaternary ammonium salts, such as quaternary ammonium perchlorates, tosylates, tetrafluoroborates, hexafluorophosphates or halides, sodium nitrate and sodium chloride.

Mention may in particular be made, among these quaternary ammonium salts, by way of examples, of tetraethylammonium perchlorate (TEAP), tetrabutyl-ammonium perchlorate (TBAP), tetrapropylammonium perchlorate (TPAP) or benzyltrimethylammonium perchlorate (BTMAP).

As indicated above, the electrolytic solutions employed according to the process in accordance with the present invention have the distinctive feature of comprising a proportion of Bronsted acid of between 50 and 100 000 ppm with respect to the total amount of the constituents of the said electrolytic solution. The choice of the concentration of Bronsted acid is preferably determined experimentally, as this concentration generally depends on the chemical nature of the electropolymerizable monomer or monomers used, on the nature of the conducting or semiconducting surface on which the electrografting is carried out, on the nature of the possible support electrolyte, on the possible uninvolved liquid and on the relative concentration of these various compounds in the reaction mixture.

A good starting point can consist in taking as a basis a type of procedure typical for electrograftings carried out in an aprotic medium. This is because the inventors have been able to observe, in an entirely unexpected and surprising way, that the thicknesses of the electrografted films obtained from such procedures could be significantly greater in the presence of higher water contents. Generally, a cumulative effect is even observed, with the result that the best procedures developed under aprotic conditions can be used and their ability to produce films with high and controlled thickness can be further improved by virtue of an optimization of the water content.

In a very particularly preferred way, this content of Bronsted acid is between 50 and 10 000 ppm.

According to the invention, the electrically conducting or semiconducting surface is preferably a surface made of stainless steel, steel, iron, copper, nickel, cobalt, niobium, aluminium (in particular when it is freshly brushed), silver, titanium, silicon (doped or undoped), titanium nitride, tungsten, tungsten nitride, tantalum or tantalum nitride or a noble metal surface chosen from gold, platinum, iridium or iridium platinum surfaces; gold surfaces being particularly preferred according to the invention.

The process in accordance with the invention can be used in particular to produce grafted polymer films with a thickness controlled with great accuracy: electrografted films are of great advantage in the manufacture of DNA chips because they are intrinsically electrical insulators. In the case where they are used to attach oligonucleotides, the hybridization of which is intended to be detected by the optical route (fluorescence), their thickness has to be controlled with great accuracy: it has to be of the order of approximately a hundred to a few hundred nanometres and has to be adjusted with an accuracy of plus or minus 5 nanometres, so as to optimize the recovery of the fluorescence intensity and to minimize the optical absorption by the substrate. Electrografted films can also be used as molecular "velcro" for the attachment of thicker layers via various types of bonds: attachment of a "reservoir" layer of medicinal molecules in order to carry out controlled release (for example, with regard to vascular implants or stents), attachment of layers, in particular mineral layers, by chemical or electrochemical layering (in particular for the mineralization of surfaces of implants, such as bony implants, or alternatively surface metallization in microelectronics, in the production of seed layers for the damascene process of copper interconnection), attachment of polymer layers by heat fusing to an electrografted layer (for the low-temperature bonding of polymers to metals), and the like. In these cases, the chemical reactivity, the interdigitation length or the glass transition temperature constitute, respectively, the parameters which make it possible to obtain good attachment via electrografted films. In point of fact, in all these applicational examples, these parameters are correlated with the thickness of the electrografted film acting as "velcro" and achieve advantageous values for films having a thickness typically of greater than 100 nm.

According to the process in accordance with the invention, the electrolysis of the electrolytic solution can be carried out by polarization under potentiostatic or galvanostatic voltammetric conditions.

The grafting and the growth of the film take place on the cathode as soon as its potential is greater, in absolute value, than the electroreduction potential of the electropolymerizable monomer or monomers used.

A subject-matter of the present invention is furthermore the electrically conducting or semiconducting surfaces obtained by employing the processes described above, at least one face of which is covered with an electrografted polymer film.

Generally, this coating has a thickness of between 10 nm and 10 μm. Very surprisingly, and as is demonstrated in the examples below, these thicknesses are significantly greater than that of the electrografted films obtained by employing the same electropolymerizable monomers according to an electropolymerization process carried out under aprotic or anhydrous conditions.

According to a preferred embodiment of the invention, this coating exhibits a thickness of between 100 nm and 10 μm.

BRIEF DESCRIPTION OF THE DRAWINGS

In addition to the preceding provisions, the invention also comprises other provisions which will emerge from the description which will follow, which refers to an example of the formation of polymethacrylonitrile films at the surface of a gold electrode in the presence of different concentrations of water in comparison with a process not in accordance with the invention and employing an electrolytic solution including ethanol, to a second example of the formation of a polymethacrylonitrile film at the surface of a gold electrode in the presence of water, to an example describing the effect of the content of methacrylonitrile monomers on the thickness of the films formed in the presence of water, to an example describing the study of the influence of water content during the formation of a polymethacrylonitrile film at the surface of a gold electrode in the presence of water, to an example relating the effect of the concentration of support electrolyte to the thickness of polymethacrylonitrile films obtained on a gold electrode in the presence of water, and to the appended figures, in which.

EXAMPLES

Example 1

Formation of Polymethacrylonitrile (PMAN) Films in the Presence of Different Concentrations of Water—Comparison with a Process Employing Ethanol This example illustrates the preparation of electrografted films with a greater thickness, for water contents of greater than 50 ppm, than under anhydrous conditions and even the preparation of films having a thickness of 400 nm for a water content of between 800 and 1000 ppm, which is inaccessible under anhydrous conditions. It is also shown that this embodiment makes it possible to greatly simplify the technical surroundings for the preparation, since the films of the present example are obtained outside glove boxes.

Figure 1:
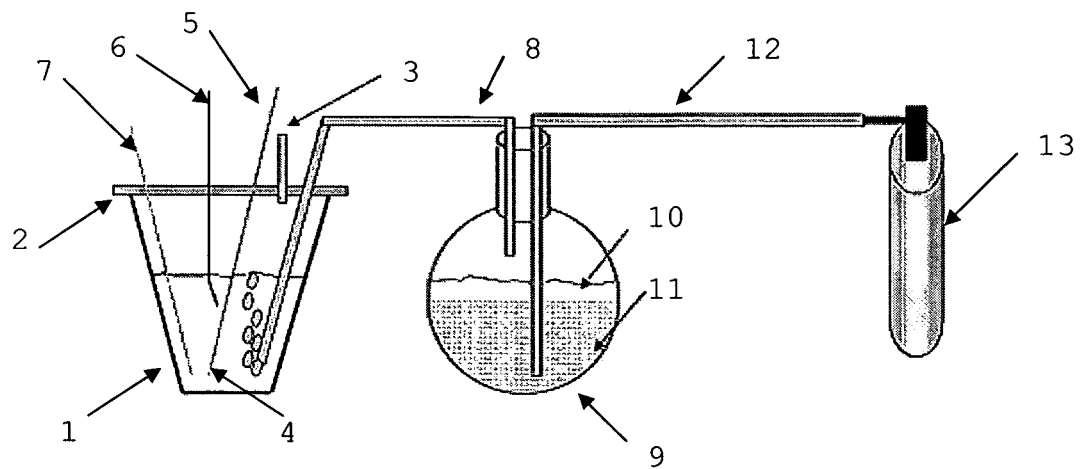
FIG. 1 represents the arrangement used to cover a gold electrode with a polymethacrylonitrile film in the presence of water. This arrangement comprises a leaktight electrolysis cell (1), equipped with a lid (2) through which a vent (3) passes, which includes an electrolytic solution (4) and a gold working electrode (5), an Ag$^+$/Ag reference electrode (6) and a platinum counter electrode (7). The electrolytic solution is subjected to continuous sparging with argon (8) which passes beforehand into a guard (9) comprising electrolytic solution (10) and molecular sieves (11), the said guard itself being subjected to sparging with argon (12,13)

These syntheses are carried out starting from solutions in dimethylformamide (DMF), distilled under argon, comprising $10^{-2}$ mol/l of TEAP and 2.5 mol/l of methacrylonitrile (MAN), distilled under argon, in which the working electrode (a strip carrying a gold layer obtained by spraying onto a glass strip), a platinum counter electrode and a reference electrode based on the $Ag^+/Ag$ couple are immersed. Several syntheses are carried out starting from the same bath, with repeated opening of the cell in order to introduce the new strips to be coated. After each synthesis, a sample of the electrolytic solution is withdrawn, the water content of which will be measured using a Karl-Fischer device. The initial water content of the synthesis solution is 35 ppm; this amount of water being that naturally present in the commercial DMF used. The arrangement used to carry out the syntheses is represented in the appended FIG. 1. In this figure, a leaktight cell including the electrolytic solution and comprising the working electrode (Working), the reference electrode ($Ag^+/Ag$ ref.) and the platinum counter electrode (Pt counter) is subjected to continuous sparging with argon which passes beforehand into a guard comprising 4 ångström molecular sieves (anhydrous zeolite) activated beforehand by leaving for one week in an oven at 350° C. 6 gold strips which have not been in contact with a controlled atmosphere on conclusion of their preparation are successively introduced. Introduction takes place by opening the lid of the cell, by gripping the strip with a crocodile clip and by then reclosing the lid. Each operation lasts approximately 30 seconds, during which the argon bubbling is not interrupted.

The water content of the electrolytic solution changes from 35 ppm at the beginning of the experiment to 1600 ppm after experimenting for approximately two hours.

The synthesis is carried out by performing 10 voltammetric sweeps at 100 mV/s between the equilibrium potential of the electrolytic solution and −2.8 V/($Ag^+$/Ag). The strip is removed from the cell, rinsed with water for 5 minutes under ultrasound and then with acetone for 5 minutes, also under ultrasound, and then dried under a stream of argon.

The thickness of the films is subsequently measured by profilometry.

Figure 2:
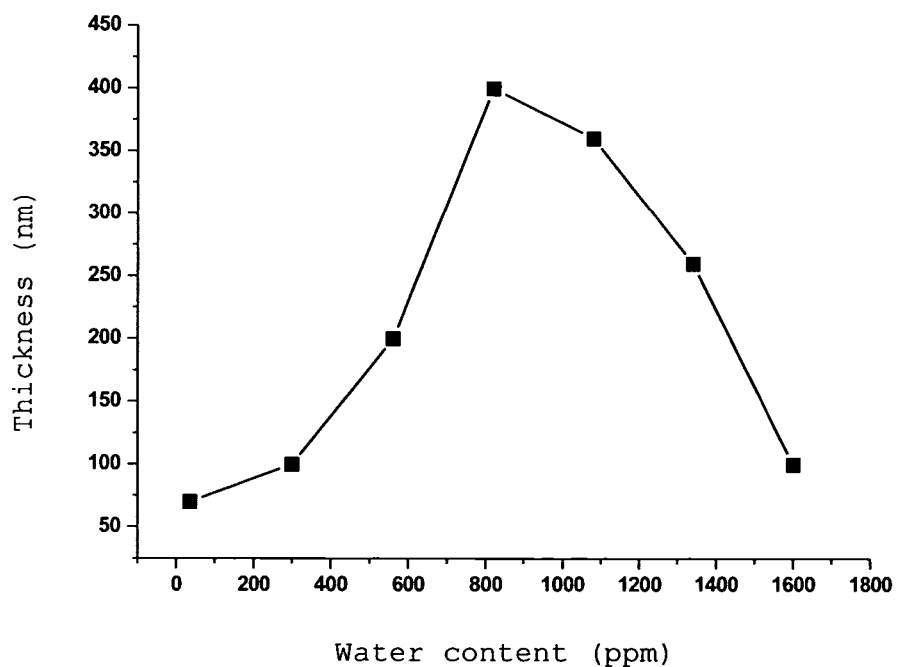
FIG. 2 represents the thicknesses (in nm) of polymethacrylonitrile films obtained by electropolymerization of methacrylonitrile monomers on gold strips as a function of different water contents (in ppm)

The results obtained are given in the appended FIG. 2, which shows the thicknesses of the films obtained (in nm) as a function of the different water contents (in ppm).

These results demonstrate that success is achieved in obtaining PMAN films on gold with a thickness of 400 nm (the reflection infrared spectrum of the films obtained shows that a spectrum in every respect in accordance with PMAN is indeed obtained), whereas this cannot be obtained only by varying the parameters of the synthetic protocol other than the water content, such as the concentration of monomer, the electrode potential, the number of pulses or the sweep rate. These other parameters might certainly themselves be readjusted in order optionally to further improve the thickness but it is observed that the adjustment of the water content makes possible, by itself alone, a much more substantial improvement.

By way of comparison, the same experiment was carried out with the water of the electrolytic solution being replaced by variable amounts of anhydrous ethanol with MAN at 4 mol/l in anhydrous DMF in the presence of $5 \times 10^{-2}$ mol/l of TEAP. The DMF and the ethanol used were dehydrated beforehand by leaving for a lengthy period over molecular sieves with a pore diameter of 4 Å conditioned beforehand by heating in an oven at 350° C. for 1 week, followed by distillation under reduced argon pressure in glove boxes. The resulting water contents in the DMF and in the ethanol, measured using a Karl-Fischer device, are 33 ppm for the DMF and less than 10 ppm for the ethanol. The handling operations were carried out in glove boxes under dry argon, where the water content of the atmosphere is less than 15 ppm. The electrolyses were carried out under voltammetric conditions via 10 sweeps at 100 mV/s from the equilibrium potential (in the region of −0.7 V/($Ag^+$/Ag)) to −2.6 V/($Ag^+$/Ag). The strips were subsequently rinsed with acetone and then dried under a stream of argon before analysis.

For each ethanol content, the percentage of transmission of the infrared absorption band of the nitrile functional groups at approximately 2270 $cm^{-1}$ is measured. The results obtained are given in FIG. 3, in which the transmission (in %) is expressed as a function of the ethanol content (in ppm).

These results show that an effect analogous to that observed for the addition of water to the electrolytic solution does not exist: the addition of ethanol results in a disappearance of the electrografted film, even at low concentrations.

Under the effect of the addition of water to the medium, a surprising effect is thus observed which the inventors attribute to the fact that water is a Bronsted acid in the reaction medium. Water contents far from aprotic and anhydrous conditions make it possible to promote the preparation of electrografted films with a greater thickness than those obtained under aprotic or anhydrous conditions. In fact it is observed that the electrografted film tends to disappear for very high water contents, in accordance with what is known in the literature. The surprising effect is that, before decreasing, the curve in FIG. 2, which gives the thickness of the film as a function of the water content, passes through a maximum for intermediate water contents.

Figure 3:
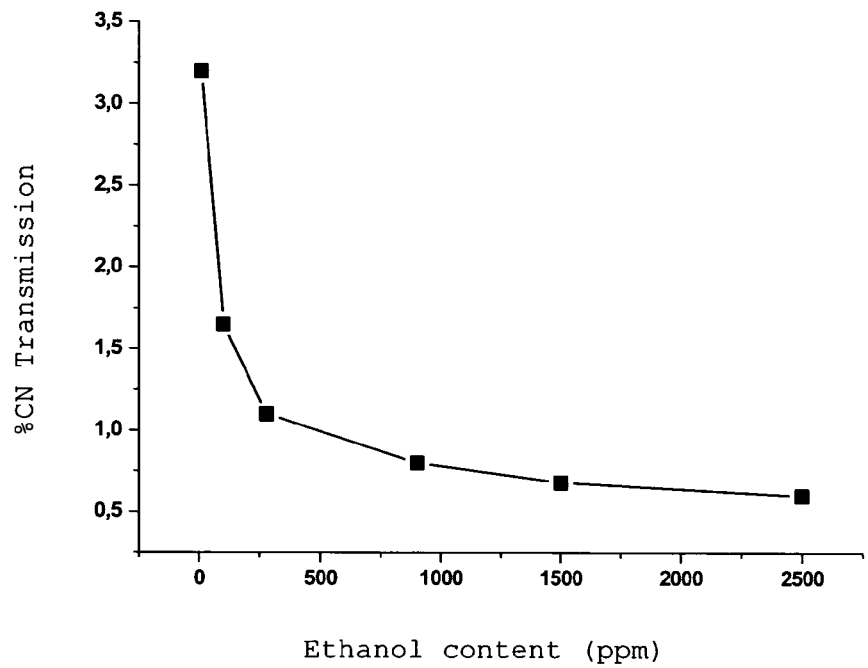
FIG. 3 represents the transmission (in %) of the infrared absorption band of the nitrile functional groups of polymethacrylonitrile films obtained by electropolymerization of methacrylonitrile monomers on gold electrodes as a function of the ethanol content (in ppm)

The results presented in FIG. 3 also show that the effect of the addition of additives of short-chain alcohol or thiol type, such as, for example, described in U.S. Pat. No. 3,759,797, is not identical to that described according to the present invention, since the effect obtained in FIG. 3 is strictly the reverse of that described in U.S. Pat. No. 3,759,797. Without having available all the necessary information and without wishing to be committed to any one theory, the inventors of the present invention believe that the characteristics of the reaction medium used in U.S. Pat. No. 3,759,797 are likely to promote the formation of polymer by radical polymerization and that the additives considered are probably good active site transfer agents and can contribute to crosslinking of the polymer formed and/or to promoting the termination reactions.

Example 2

Formation of a Polymethacrylonitrile (PMAN) Film in the Presence of Water

Example 1 above illustrates the fact that it is possible, for a given monomer concentration and a given procedure, to target a thickness range by adjusting the water content of the medium. It may be noted that an anhydrous solution (for example, a solution of DMF distilled under argon in glove boxes) reexposed to the air sees its water content change up to its saturation value in a few minutes. In Example 1 given above, sparging argon, dehydrated beforehand by passing into a guard comprising activated molecular sieves in a DMF solution, into the electrochemical cell makes it possible to extend the period of adjustment of the water content to 2 hours.

In the present example, the molecular sieves are introduced directly into the electrografting cell. It is shown that the regulation of the water content obtained is effective by preparing the synthesis solutions directly from the commercial products, without distillation or dehydration.

The operating conditions, and in particular the synthesis procedures and solutions, are the same as for Example 1 above, except that none of the reactants is distilled. The water contents of the commercial DMF and of the monomer are measured at 150 ppm approximately. A carpet of 5 ångström molecular sieves, preactivated at 200° C. for 1 week, with a thickness of approximately 2 cm is introduced into the electrochemical cell, followed by the synthesis solution. A measurement of the water content, carried out on a sample withdrawn after a few minutes, gives a water content of 30 ppm. The solution is stirred with a magnetic bar throughout the period of the syntheses.

A sample withdrawn after 4 hours reveals a water content of 328 ppm. An electrografted PMAN film is produced after electrolysing for 4 hours: the thickness of the film obtained is 125 nm, in good agreement with the results obtained in Example 1. Just as in Example 1, no structural defect is observed in the IRRAS spectrum of the PMAN film thus obtained.

Example 3

Study of the Effect of the Content of MAN Monomers on the Formation of a PMAN Film in the Presence of Water The aim of this example is to illustrate the fact that the thickness ranges which can be achieved by varying the water content also depend on the content of monomers but that, whatever the concentration of monomers, the same tendencies are observed.

Electrografted PMAN films are produced under the same operating conditions as those set out above in Example 2 but with an initial concentration of monomers of 5 mol/l and a TEAP content of $5 \times 10^{-2}$ mol/l in the DMF. The water contents are adjusted this time, by addition of distilled water to the reaction medium, to 300, 500 and 1000 ppm. The films are then produced by 10 voltammetric sweeps at 100 mV/s between the equilibrium potential (in the region of −1 V/($Ag^+$/Ag)) and −3.2 V/($Ag^+$/Ag). The strips thus treated are rinsed under the same conditions as above.

The thicknesses, measured on a profilometer and compared with those of the films obtained above in Example 1, are given in Table I below:

TABLE I

| Water content (ppm) | Thickness of the films (nm) | |
|---|---|---|
| | According to Example 1 (MAN: 2.5 mol/l) | According to Example 2 (MAN: 5 mol/l) |
| 300 | 100 | 569 |
| 500 | 175 | 612 |
| 1000 | 360 | 37 |

By way of comparison, the PMAN films obtained under the same operating conditions but in an anhydrous medium have a thickness of the order of 20 to 50 nm approximately.

Example 4

Study of the Influence of the Water Content During the Formation of a PMAN Film

The aim of this example is to illustrate the fact that the curves giving the thickness as a function of the water content are curves which pass through a maximum, the decrease of which beyond the maximum is slow. This thus means, on the one hand, that the addition of water makes it possible to increase the maximum thickness which can be obtained for a given procedure and a given concentration and, on the other hand, that better control of the thickness of electrografted films is obtained if control with regard to the water content is carried out at concentrations greater than that of the maximum.

To do this, electrografted PMAN films are produced on gold strips under the same operating conditions as those set out above in Example No. 2, apart from the fact that 3 voltammetric sweeps are carried out at 200 mV/s between −0.7 V/($Ag^+$/Ag) and −2.6 V/($Ag^+$/Ag). The water content is adjusted to contents varying between 0 and 2200 ppm, this being the case for different concentrations of monomers: 0.1, 1, 2.5 and 9.54 mol/l.

Figure 4:
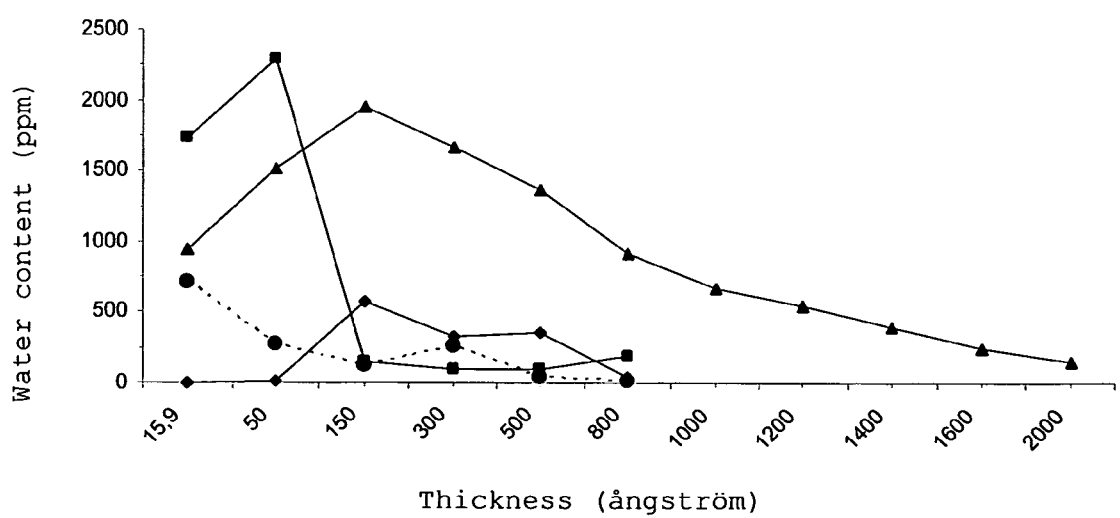
FIG. 4 represents the thickness (in ångströms) of polymethacrylonitrile films obtained by electropolymerization on gold strips at different concentrations of methacrylonitrile monomers (diamonds: 0.1 mol/l; squares: 1 mol/l; triangles: 2.5 mol/l and circles: 9.54 mol/l) as a function of the water content (in ppm)

The results obtained are given in the appended FIG. 4, in which the thickness obtained (in ångströms) for each concentration of monomer (diamonds: 0.1 mol/l; squares: 1 mol/l; triangles: 2.5 mol/l and circles: 9.54 mol/l) is expressed as a function of the water content (in ppm).

These results show, in all cases, the existence of a water content of greater than 50 ppm for which the thickness obtained is greater than that accessible under anhydrous conditions. It is also observed that the slopes of the curves are, in absolute value, lower above this concentration than below: it is therefore with control of the water content above this concentration, and not below, that it is possible to achieve good control with regard to the thicknesses of the films obtained.

The same experiment carried out on nickel strips leads to the same observations.

Example 5

Study of the Effect of the Concentration of the Support Electrolyte on the Thickness of PMAN Films The aim of this example is to illustrate the fact that the position of the maximum of the thickness/water content curves can also depend on the presence of a support electrolyte and on its content in the electrolytic solution. In particular, it is observed that this maximum is displaced towards the higher water contents when the content of support electrolyte increases. This makes it possible to envisage better control of the water content, and thus of the thicknesses of films, by producing formulations with a greater concentration of support electrolyte: a solution increases in hygroscopicity as its water content decreases. Having chosen a given content of support electrolyte, the water content of the medium can be adjusted to the value of the maximum of the thickness/water content curves and it is thus possible to have available solutions which decrease in hygroscopicity, and thus increase in stability, as this water content increases.

Electrografted PMAN films are produced on gold using 2.5 mol/l solutions of MAN (undistilled) in DMF (undistilled). TEAP is used as support electrolyte. The solutions are prepared from anhydrous TEAP and the water content, measured using a Karl-Fischer device, is adjusted by addition of distilled water.

Figure 5:
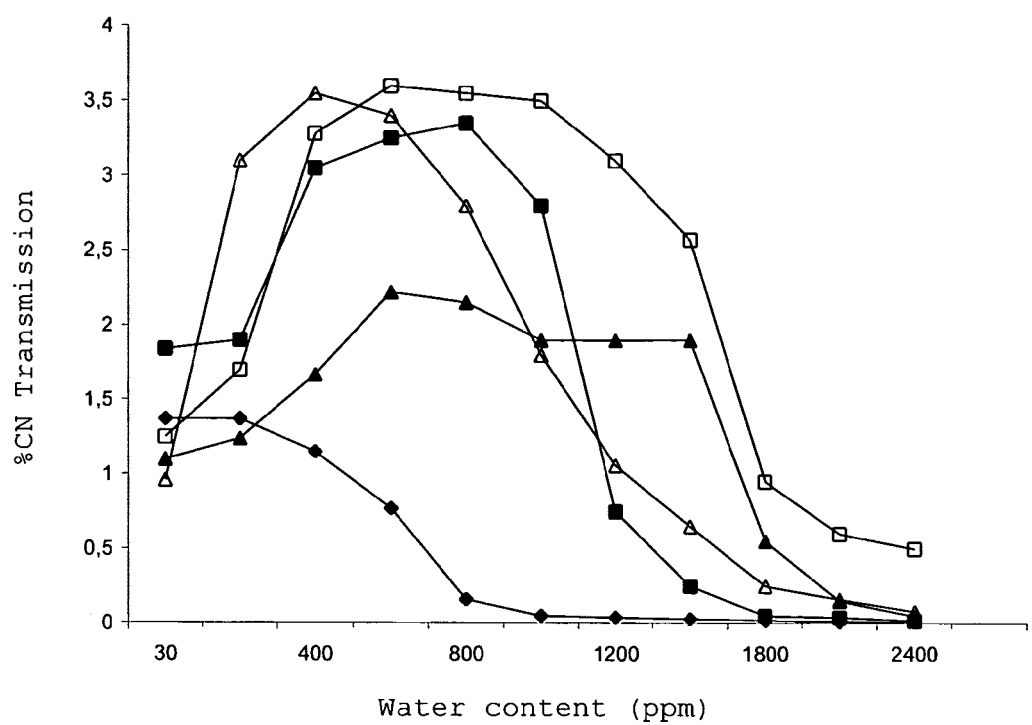
FIG. 5 represents the thickness (in ångströms) of polymethacrylonitrile films obtained by electropolymerization on gold strips for different concentrations of support electrolytes (TEAP) in the electrolysis solution as a function of water content (in ppm).

Different electrografted films are produced for TEAP contents of between $5 \times 10^{-3}$ and $5 \times 10^{-1}$ mol/l and for water contents of between 16 and 2400 ppm. The thicknesses are evaluated from the intensity of the CN label measured by IRRAS. The results are given in the appended FIG. 5, which represents, for each TEAP concentration, the thickness of the films obtained (in ångströms) as a function of the water content (in ppm). In this figure, the solid diamonds correspond to the curve obtained with a TEAP concentration of $5 \times 10^{-3}$ mol/l, the solid squares to a concentration of $1 \times 10^{-2}$ mol/l, the solid triangles to a concentration of $5 \times 10^{-2}$ mol/l, the hollow squares below to a concentration of $1 \times 10^{-1}$ mol/l and the hollow triangles to a concentration of $5 \times 10^{-1}$ mol/l.

The invention claimed is:

1. A process for the formation of a polymer film on a cathodic electrically conducting or semiconducting surface by electrografting, comprising:
   a) preparing an electrolytic solution consisting of one electropolymerizable monomer and one source of protons which is chosen from compounds which are Bronsted acids in the said electrolytic solution, the said Bronsted acids being chosen from water and weak acids, and the said source of protons being present in an amount of between 50 and 10 000 ppm with respect to the total amount of the constituents of the said electrolytic solution, and optionally at least one solvent; and
   b) electrolysing the said solution in an electrolysis cell by using the conducting or semiconducting surface to be covered as working electrode and at least one counter electrode, to result, by electroreduction or electro-oxidation of the said solution, in the formation of an electrografted polymer film on the said surface via an anionic polymerization process.

2. The process according to claim 1, wherein the Bronsted acids are chosen from water; hydrogen fluoride; ammonium fluoride; nitrous acid; molecules carrying carboxylic acid groups or ammonium, amine, pyridinium or phenol groups.

3. The process according to claim 1 wherein the electropolymerizable monomers are chosen from activated vinyl monomers and from cyclic molecules cleavable by nucleophilic attack corresponding respectively to the following formulae (I) and (II):

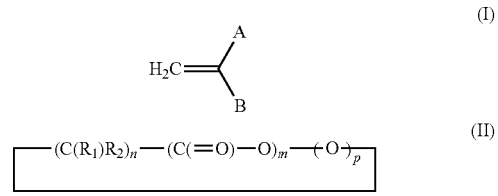

in which:
A, B, $R_1$ and $R_2$, which are identical or different, represent a hydrogen atom; a $C_1$-$C_4$ alkyl group; a nitrile group; an organic functional group chosen from the following functional groups: hydroxyl, amine: —$NH_x$ with x =1 or 2, thiol, carboxylic acid, ester, amide: —C(=O)$NH_y$, in which y =1 or 2, imide, imidoester, acid halide: —C(=O)X in which X represents a halogen atom chosen from fluorine, chlorine, bromine and iodine, acid anhydride: —C(=O)OC(=O), nitrile, succinimide, phthalimide, isocyanate, epoxide, siloxane: —Si(OH)$_z$ in which z is an integer between 1 and 3 inclusive; benzoquinone, carbonyldiimidazole, para-toluene-sulphonyl, paranitrophenyl chloroformate, ethylenic and vinyl, aromatic and in particular toluene, benzene, halobenzene, pyridine, pyrimidine, styrene or halostyrene and their substituted equivalents; a functional group which can complex cations; molecular structures substituted and/or functionalized starting from these functional groups; groups which can be cleaved by thermal or photon activation; electroactive groups; electrocleavable groups; and the mixtures of the abovementioned monomers and groups;

n, m and p, which are identical or different, are integers between 0 and 20 inclusive.

4. The process according to claim 3, wherein the activated vinyl monomers of formula (I) are chosen from acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate, acrylamides, cyanoacrylates, diacrylates or dimethacrylates, triacrylates or trimethacrylates, tetraacrylates or tetramethacrylates, acrylic acid, methacrylic acid, styrene and its derivatives, para-chlorostyrene, pentafluorostyrene, N-vinylpyrrolidone, -vinylpyridine, 2-vinylpyridine, vinyl halides, acryloyl halides, methacryloyl halides, vinyl crosslinking agents or crosslinking agents based on acrylate, on methacrylate, and on their derivatives.

5. The process according to claim 1, wherein the concentration of electropolymerizable monomers in the electrolytic solution is between 0.1 and 10 mol/l.

6. The process according to claim 1, wherein the electrolytic solution additionally consisting of the at least one solvent chosen from dimethylformamide, ethyl acetate, acetonitrile, tetrahydrofuran and chlorinated solvents.

7. The process according to claim 1, wherein the electrically conducting or semiconducting surface is a surface made of stainless steel, steel, iron, copper, nickel, cobalt, niobium, aluminium, silver, titanium, silicon, titanium nitride, tungsten, tungsten nitride, tantalum, tantalum nitride or a noble metal surface chosen from gold, platinum, iridium or iridium platinum surfaces.

8. The process according to claim 1, wherein the electrolysis of the electrolytic solution is carried out by polarization under potentiostatic or galvanostatic voltammetric conditions.

* * * * *